US011424925B2

(12) United States Patent
Goodman

(10) Patent No.: US 11,424,925 B2
(45) Date of Patent: Aug. 23, 2022

(54) SYSTEMS AND METHODS FOR MINTING A PHYSICAL DEVICE BASED ON HARDWARE UNIQUE KEY GENERATION

(71) Applicant: vitroTV Corporation, Austin, TX (US)

(72) Inventor: David H. Goodman, Austin, TX (US)

(73) Assignee: VITRO TECHNOLOGY CORPORATION, Austin, TX (US)

(*) Notice: Subject to any disclaimer, the term of this patent is extended or adjusted under 35 U.S.C. 154(b) by 286 days.

(21) Appl. No.: 16/865,671

(22) Filed: May 4, 2020

(65) Prior Publication Data
US 2020/0266987 A1 Aug. 20, 2020

Related U.S. Application Data

(63) Continuation-in-part of application No. PCT/US2019/053141, filed on Sep. 26, 2019.
(Continued)

(51) Int. Cl.
G06F 21/45 (2013.01)
G06F 21/72 (2013.01)
(Continued)

(52) U.S. Cl.
CPC ........ *H04L 9/3073* (2013.01); *G06F 16/2365* (2019.01); *G06Q 20/0655* (2013.01); *G06Q 20/0855* (2013.01); *G06Q 20/127* (2013.01); *G06Q 20/3678* (2013.01); *G06Q 20/3829* (2013.01); *G06Q 20/38215* (2013.01); *G06Q 20/401* (2013.01); *H04L 9/321* (2013.01);
(Continued)

(58) Field of Classification Search
CPC ..... H04L 9/3073; H04L 9/321; H04L 9/3263; H04L 63/0823; G06F 16/2365; G06Q 20/0655; G06Q 20/0855; G06Q 20/127; G06Q 20/3678; G06Q 20/38215; G06Q 20/3829; G06Q 20/401; G06Q 2220/00
See application file for complete search history.

(56) References Cited

U.S. PATENT DOCUMENTS

2018/0165660 A1* 6/2018 High ............... G07F 15/008
2018/0183587 A1 6/2018 Won
(Continued)

FOREIGN PATENT DOCUMENTS

CA 3060050 A1 * 11/2018 ........... G06Q 20/102
CN 108092778 5/2018
(Continued)

OTHER PUBLICATIONS

Performance Comparison of IoT Based Metering System with Different Blockchain Platforms. Edirimanna. ICACT. (Year: 2020).*
(Continued)

*Primary Examiner* — Venkat Perungavoor
(74) *Attorney, Agent, or Firm* — Pierson IP, PLLC

(57) ABSTRACT

Minting a physical computing device based on unique key generation, wherein the key generation is configured to create a private-public key pair. In implementations, the key pair may be generated upon initialization of the physical computing device, such that the physical computing device is minted with the key pair. The key pair may be utilized as a token for supply-chain billings, payments, auditing, etc. associated with the physical computing device.

4 Claims, 2 Drawing Sheets

Related U.S. Application Data

(60) Provisional application No. 62/740,670, filed on Oct. 3, 2018, provisional application No. 62/736,784, filed on Sep. 26, 2018.

(51) Int. Cl.
| | | |
|---|---|---|
| *H04L 9/30* | (2006.01) | |
| *G06F 16/23* | (2019.01) | |
| *G06Q 20/06* | (2012.01) | |
| *G06Q 20/08* | (2012.01) | |
| *G06Q 20/12* | (2012.01) | |
| *G06Q 20/36* | (2012.01) | |
| *G06Q 20/38* | (2012.01) | |
| *G06Q 20/40* | (2012.01) | |
| *H04L 9/32* | (2006.01) | |
| *H04L 9/40* | (2022.01) | |
| *G06F 21/64* | (2013.01) | |

(52) U.S. Cl.
CPC ........ *H04L 9/3263* (2013.01); *H04L 63/0823* (2013.01); *G06Q 2220/00* (2013.01)

(56) References Cited

U.S. PATENT DOCUMENTS

| | | | |
|---|---|---|---|
| 2019/0086235 A1* | 3/2019 | Cui | G01D 4/004 |
| 2019/0295069 A1* | 9/2019 | Pala | G06Q 20/3678 |
| 2019/0311443 A1* | 10/2019 | Blades | G06Q 40/12 |
| 2020/0005264 A1* | 1/2020 | Patterson | H04L 9/3239 |
| 2021/0263083 A1* | 8/2021 | Hwang | G06Q 50/06 |
| 2021/0342826 A1* | 11/2021 | Miller | G06Q 20/389 |

FOREIGN PATENT DOCUMENTS

| | | | | |
|---|---|---|---|---|
| EP | 3550532 A1 * | 10/2019 | | G01D 4/002 |
| EP | 3581892 A1 * | 12/2019 | | G01D 4/00 |

OTHER PUBLICATIONS

A blockchain security scheme to support fog-based internet of things. Mohanpatra. Elsevier. (Year: 2021).*

Towards a set aggregation-based data integrity scheme for smart grids. Tahir. Springer. (Year: 2017).*

Lightblocks: A Trusted Lightweight Signcryption and Consensus Scheme for Industrial Iot Ecosystems. Bhattacharya. SSRN. (Year: 2022).*

* cited by examiner

SYSTEMS AND METHODS FOR MINTING A PHYSICAL DEVICE BASED ON HARDWARE UNIQUE KEY GENERATION

BACKGROUND INFORMATION

Field of the Disclosure

Examples of the present disclosure are related to systems and methods for secure hardware authentication. More particularly, embodiments may utilize blockchain-hyper ledgers using a key pair as a permanent identification element for a physical device or meter.

Background

Blockchain is a list of records, called blocks, which are linked to cryptology. Each block includes a cryptographic hash of the previous block, a timestamp, and transaction data. Blockchain is resistant to modification of the data and transactions between multiple parties. Once recorded, data in any given block cannot be altered retroactively without the alteration of all subsequent blocks.

Utilizing a blockchain, a decentralized, distributed, and public digital ledger can be created to record transactions across many computers. This allows the participants to verify and audit transactions inexpensively.

Conventionally, blockchain technology is utilized for digital wallets based on public and private keys. A digital wallet may have multiple public and private key pairs and are used to spend cryptocurrency. However, digital wallets are decentralized and are not tied to specific hardware. Situations arise where it is desirable to verify and audit transactions associated with a specific hardware element utilizing blockchain.

Accordingly, needs exist for more effective and efficient systems and methods for a hardware device that is configured to generate a key pair upon initialization to create a blockchain, wherein the blockchain is utilized to produce an audit trail for the hardware device.

SUMMARY

Embodiments are configured to mint, establish, and permanently allocate an address for a physical computing device based on unique key generation, wherein the key generation is configured to create a private-public key pair. Embodiments may be configured to tie financial transactions associated with physical equipment with a physical computing device, wherein the physical equipment may be a metering device that is configured to provide a service. The data obtained associated with the metering of the physical equipment with the physical computing device may be utilized to determine what services are being created and when. This may allow remote service providers, such as financial institutions, energy companies, or other remote service providers, to remotely track the performance of a physical computing device tied to physical equipment. Utilizing a block chain with the key chain, an immutable record may be created, which may create a proof of origin to automatically track and securely meter this remote performance of the remote physical equipment.

In implementations, the key pair may be generated upon initialization of the physical computing device, such that the physical computing device is minted with the key pair. The key pair may be utilized as a token for supply-chain billings, payments, auditing, etc. associated with the physical computing device. In specific embodiments, the physical computing device may be a meter that measures and records quantities at specific intervals, such as a power meter, water meter, etc.

Utilizing the key pair, a digital certificate may be issued for the physical computing device, wherein the digital certificate may enable the physical computing device may be registered with a cloud computing service provider. In embodiments, to receive the digital certificate, the physical computing device may transmit a certificate request with the generated public key to a trusted third party (TTP), such as Digicert. The trusted third party may be configured to facilitate interactions between two parties, such as the physical computing device and the cloud computing service provider. The trusted third party may respond to the certificate request with a data associated with the digital certificate that is encoded based on the public key. The data to create the digital certificate may only be decrypted utilizing the private key stored only on the physical computing device without the private key being communicated from the physical computing device.

The physical computing device may transmit the digital certificate to a remote service provider along with a request for computing services. The computing service provider may transmit the digital certificate to the trusted third party to authenticate the digital certificate. Responsive to authenticating the digital certificate, the physical computing device may be registered with the cloud computing service provider. Transactions between the cloud computing service provider and the physical computing device may be automatically updated into a ledger using blockchain technology. For examples, transactions may be associating updating a meter to record the amount of power, water, etc. consumed over a time period, wherein the ledger is updated at continuous intervals with time stamp data and quantity data through the block chain utilizing the block chain.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
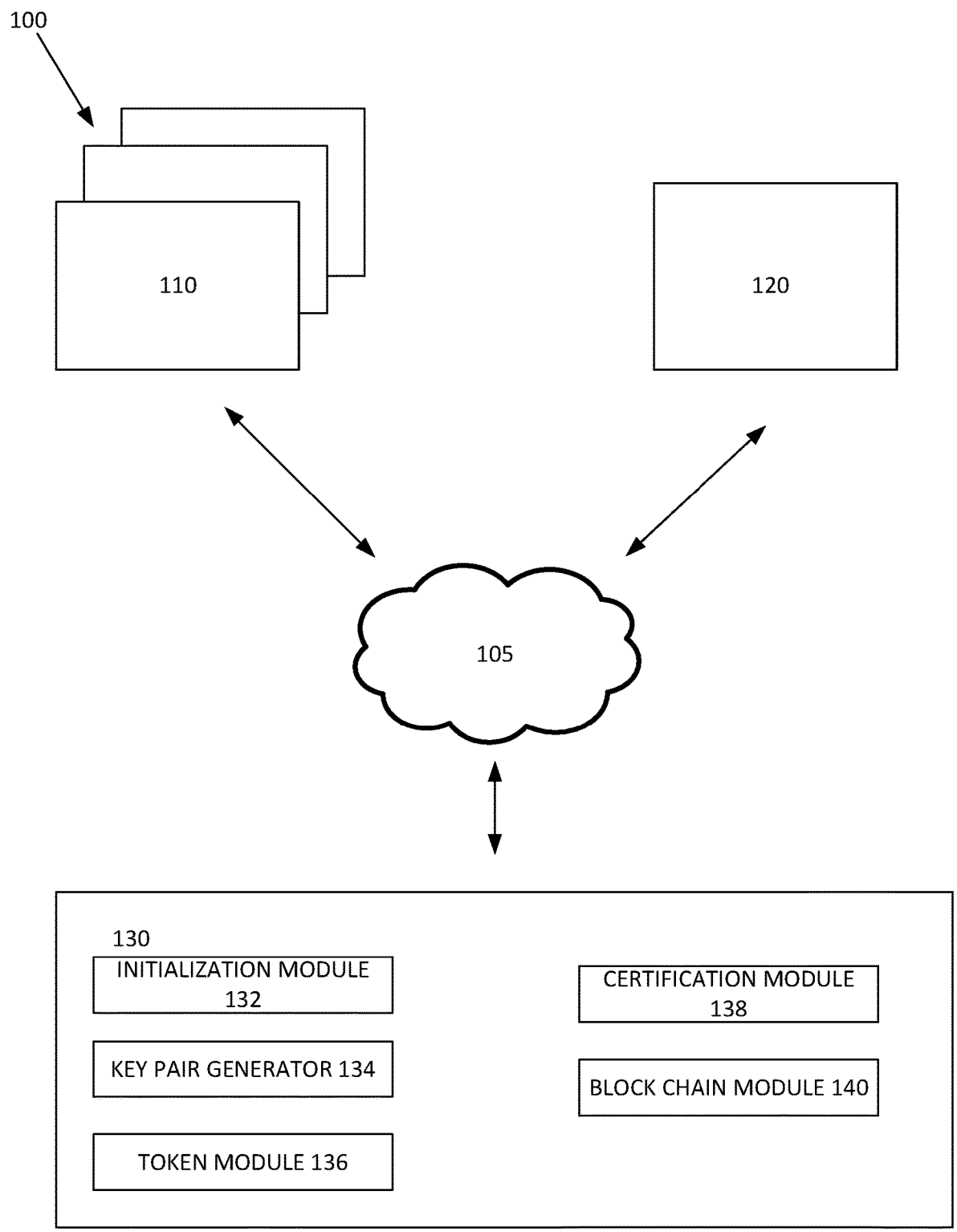
FIG. 1 depicts a topology for asymmetrical cryptology between a physical computer device, remote service provider, and trusted third party over a network, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

FIG. 1 depicts a topology for asymmetrical cryptology between a physical computer device 130, remote service provider 110, and a trusted third party 120 over a network 105.

Network 105 may be a wide area network (WAN) that extends over a large geographical distance, a wireless local area network (WLAN) that is configured to link two or more devices within a limited area, such as a home, school, commercial building, office building, etc., or any other type of wireless or wired network. For example, network 105 may be a wireless communications network, digital radio, or cellular network operating over CDMA, GSM, etc. The network 105 may be operated by telecommunications providers. Alternatively, network 105 may be a Wi-Fi network. Network 105 may enable the communication of data between remote service provider 110, trusted third party 120, and physical computing device 130.

Remote service provider 110 may be a computing device, such as a general hardware platform server configured to support mobile applications, software, content, and the like executed on physical computing device 130. Remote service provider 110 may include physical computing devices residing at a particular location or may be deployed in a cloud computing network environment. In this description, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Remote service provider 110 may include any combination of one or more computer-usable or computer-readable content.

In implementations, remote service provider 110 may supply cloud computing service, such as through amazon web services, to physical computing device 130. In other embodiments, remote service provider 110 may be: a cellular network provider that allows communication of data to and from physical computing device 130, internet service, video service provider, banking provider, general service providers, such as an energy service provider, water service provider, etc.

Trusted third party 120 may be a hardware processing device that facilities interactions between two other devices, such as physical computing device 130 and remote service provider 110. In implementations, trusted third party 120 may be configured review critical transaction communications between remote service provider 110 and physical computing device 130. Trusted third party 120 may be a certificate authority that is configured to issue digital certificates that certify the ownership of a public key. For example, trusted third party 120 may be configured to generate a digital certificate to physical computing device 130 responsive to receiving a public key from physical computing device 130, wherein the trusted third party 120 is configured to determine that the digital certificate is associated with a physical computing device 130 that has the corresponding private key stored within memory of the physical computing device 130. Upon generating the digital certificate for the physical computing device 130, trusted third party 120 may communicate the digital certificate to the physical computing device 130, wherein the digital certificate may be encrypted based on the public key. Furthermore, trusted third party 120 may be configured to receive the digital certificate associated with the physical computing device 130 from remote service provider 110. This may independently verify a secure communication chain between remote service provider 110 and physical computing device 130.

Physical computing device 130 may be a computer, tablet, control system, robot, appliance, thin client, mobile telephone, or any other device with a hardware processing device that is configured to automatically implement sequences automatically. Physical computing device 130 may be configured to request and utilize computing resources from remote service provider 110 to implement a wide range or tasks. In implementations, physical computing device 130 may be directed tied to a meter that is configured to continuously and routinely acquire quantity data and time stamp data.

Physical computing device 130 may include an initialization module 132, key pair generator 134, token module 136, certification module 138, block chain module 140.

Initialization module 132 may be a hardware processing device that is configured to provide runtime services for the operating system and programs associated with physical computing device 130. Initialization module 132 may be configured to scan extensions of physical computing device's memory to determine if physical computing device 130 is powered on, has connectivity to network 105, what operating system is running, or any other initiation step. Additionally, initialization module 132 may be configured to determine what remote services physical computing device 130 requires, wherein the remote services may be associated with remote service provider 110. For example, initialization module 132 may have data stored that requires cloud computing resources from remote service provider 110, connectivity support, hosting website, etc.

Key pair generator 134 may be a self-contained and isolated hardware processing device configured to determine a key pair including a public key and a private key responsive to initialization module 132 initializing physical computing device 130. In implementations, key pair generator 136 may utilize elliptic-curve cryptography (ECC) or any other method to generate a key pair, which may be implemented in a just-in-time registration. Key pair generator 134 may be configured to generate a single key pair responsive to initializing physical computing device 130 the first time.

Token module 136 may be a hardware memory device configured to store data associated with the generated key pair, such as the public and private key. In further implementations, token module 136 may include a digital wallet that is configured to store cryptocurrencies that are tied to the generated key pair, which can be utilized to pay for remote computing resources.

Certification module 138 may be a hardware processing and communication device that is configured to certify physical computing device 130 to other computing elements. In implementations, certification module 138 may be configured to transmit the public key associated with physical computing device 130 to trusted third party 120. Responsive to transmitting the public key, physical computing device 130 may receive a digital certificate from trusted third party 120, wherein the digital certificate is encrypted based on the public key. Utilizing the private key stored within token module 136, certification module 138 may decrypt the certificate as well as other data transmitted from trusted third party 120.

Blockchain module 140 may be a hardware processing and memory device configured to generate a blockchain ledger from remote computing resources from remote service providers 110 for physical computing device 130. Blockchain module 140 may be configured to record and automatically update transactions between physical computing device 130 and remote service providers 110 that are communicated through trusted third party 120. In implementations, blockchain module 140 may receive a transaction request that may be posted on the ledger based on the public key, which can be authenticated using the private key stored in token module 136. Additionally, physical computing device 130 may transmit payment for the transaction requests that can be paid and recorded on the ledger based on the private key stored within token module 136. This may enable remote service providers 110 to access the ledger to determine if payments for the remote computing services are paid for auditing purposes.

In further implementations, physical computing device 130 may transmit payment for a transaction associated with the metering data, including the quantity and time stamp data, to remote service providers 110. This may enable remote service providers to access the ledger to determine the quantities utilized by physical computing device 130 and when. In embodiments, the private key at the physical computing device 130 may be utilized to create a dataset associated with the metering of data at the physical computing device 130. This may be part of requesting the services associated with the remote service provider 110. Utilizing the cryptology, and without having the private key, the remote service provider 110 may verify that the physical computing device 130 signed the request for services.

Furthermore, a physical computing device 130 may be configured to transmit the private key to an oracle, which may be another remote computing device that is independent and secure. Utilizing the oracle, the remote service provider 110 may transmit a data set associated with the request for services to the remote service provider 110 from the physical computing device 130. The oracle may be able to independently verify that the specific private key was utilized to transmit the request for services from the physical computing device 130. As, third parties may utilize the oracle to determine if the physical computing device 130 transmitted a request for services from the remote service provider 110.

For example, in embodiments, physical computing device 130 may be physically located at a water well, with a water meter. Responsive to initialization, the physical computing device 130 may generate a key pair, a public and private key. The physical computing device 130 may transit the public key to a trusted third party 120, as part of a certificate exchange for a root of trust procedure. The trusted third party 120 may generate a digital certificate for physical computing device 130, being the water well meter, wherein the digital certificate indicates that the private key is stored remotely from trusted third party 120. Utilizing the digital certificate, the physical computing device 130 may transmit verified service data, including a quantity of services rendered or produced (such as water used, bandwidth consumed, power consumed, etc.) and timestamp data to a remote service provider 110 and trusted third party 120, wherein this verified service data is added to a block chain ledger. Further, the remote service provider 110 may utilize the public key to update the block chain ledge to post transactions associated with the physical computing device, such as payments of goods and services rendered.

Figure 2:
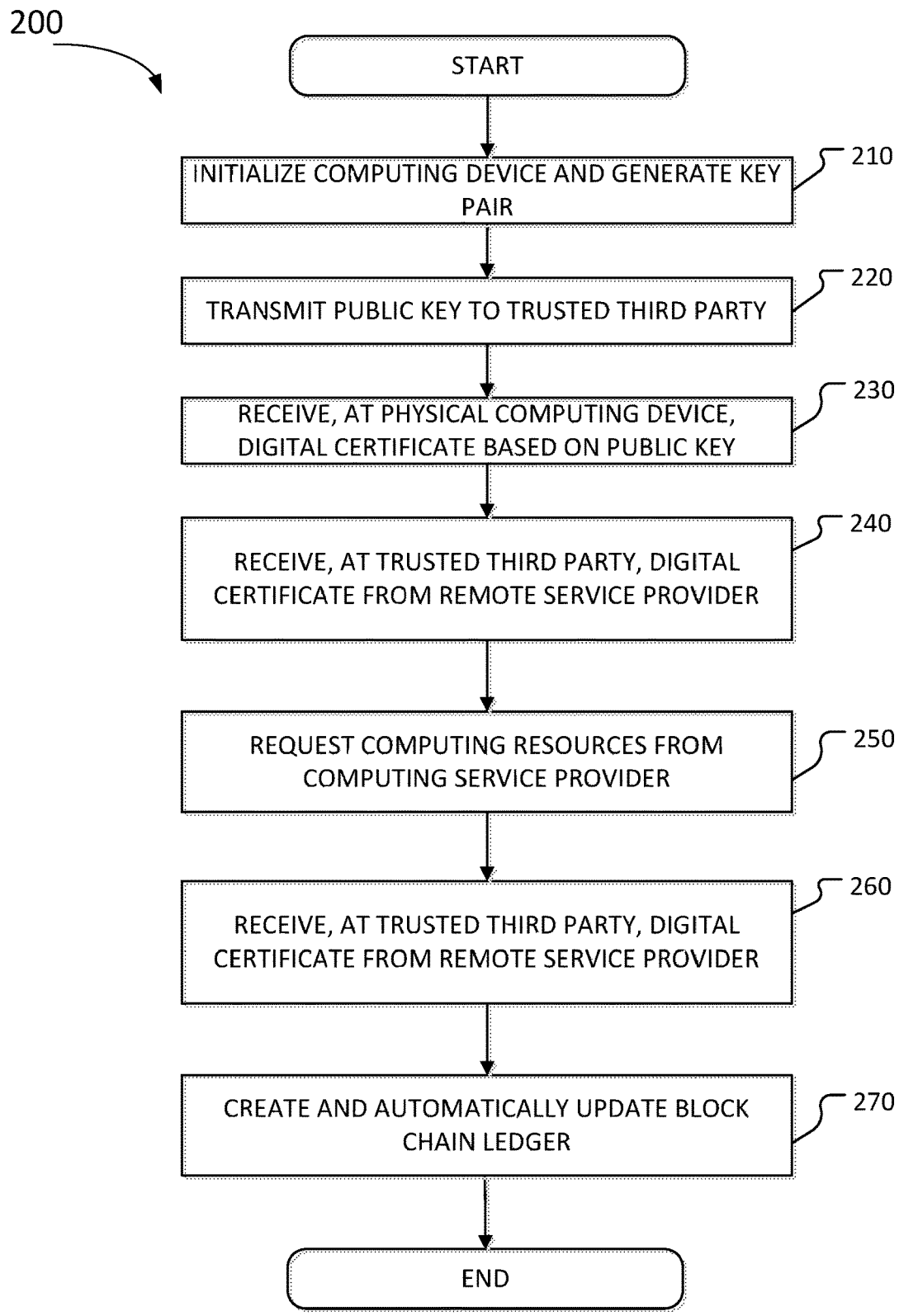
FIG. 2 illustrates a method for a hardware verified feedback loop for content presented on a display device.

FIG. 2 illustrates a method 200 for a hardware verified feedback loop for content presented on a display device. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a solid-state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At operation 210, a physical computing device may be initialized and generate a private-public key pair.

At operation 220, the physical computing device may transmit the public key to a trusted third party. This may be part of a certificate exchange for a root of trust procedure.

At operation 230, the trusted third party may generate a digital certificate for the physical computing device based on the received public key. The digital certificate may indicate that the private key is stored remotely from the trusted third party. The trusted third party may decrypt the digital certificate based on the public key.

At operation 240, the digital certificate may be received by the physical computing device, and can be decrypted based on the locally stored private key.

At operation 250, the physical computing device may request remote computing services from remote service providers, such as web hosting, cloud computing resources, communication resources, etc. When requesting the remote computing services, the physical computing device may transmit the digital certificate to the remote service providers.

At operation 260, the remote service providers may transmit the digital certificate associated with request for services and the physical computing device to the trusted third party. Responsive to certifying the digital certificate at the trusted third party based on the received digital certificate from the remote service provider, the trusted third party may send an authentication message to the remote service provider indicating that the physical computing device is authenticated.

At operation 270, responsive to authenticating the physical computing device, the physical computing device may create a blockchain ledger. The blockchain ledger may enable remote service providers to post transactions associated with the physical computing device utilizing the public key. The blockchain ledger may also enable a customer associated with physical computing device to pay for the transactions based on the private key, and both parties may audit the ledger.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable content may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

What is claimed is:

1. A method for secure hardware authentication comprising:

generating a private-public key pair for a physical computing device upon initiation of the physical computing device, the physical computing device being configured to utilize services wherein the private-public key pair is configured to be utilized for a block chain ledger;

storing the private key of the private-public key pair locally on the physical computing device upon the initiation of the physical computing device;

transmitting the public key of the private-public key pair to a remote services hardware processing device;

providing services, via the remote services hardware processing device;

receiving, at the remote services hardware processing device, the public key from the physical computing device;

facilitating, via a trusted third party hardware processing device, interactions between the physical computing device and the remote services hardware;

generating, by the trusted third party hardware device, a digital certificate for the physical computing device based on the public key;

transmitting the digital certificate to the physical computing device;

transmitting, by the physical computing device, the digital certificate to the remote services hardware processing device responsive to requesting the services from the remote services hardware processing device;

communicating the digital certificate from the remote services hardware to the trusted third party hardware processing device to certify the digital certificate receiving, at the remote services hardware processing device, an authentication from the third party hardware processing device responsive to the third party hardware processing device certifying the digital certificate;

creating, at the physical computing device, a block chain ledger responsive to being authenticated by the remote services hardware processing device, the block chain ledger enabling the remote services hardware processing device to post transactions associated with the physical computing device utilizing the public key;

wherein the block chain ledger is configured to enable the physical computing device to pay for the transactions posted by the remote services hardware processing device utilizing the private key stored only on the physical computing device.

2. The method of claim 1, wherein the physical computing device is a metering device.

3. The method of claim 2, wherein the physical computing device includes a block chain hardware device configured to locally store data associated with the block chain ledger.

4. A method for secure hardware authentication comprising:
- generating a private-public key pair for a physical computing device upon initiation of the physical computing device, the physical computing device being configured to utilize services wherein the private-public key pair is configured to be utilized for a block chain ledger;
- storing the private key of the private-public key pair locally on the physical computing device upon the initiation of the physical computing device;
- transmitting the public key of the private-public key pair to a remote services hardware device;
- providing services, via the remote services hardware device;
- receiving, at the remote services hardware device, the public key from the physical computing device;
- facilitating, via a trusted third party hardware device, interactions between the physical computing device and the remote services hardware;
- generating, by the trusted third party hardware device, a digital certificate for the physical computing device based on the public key;
- transmitting the digital certificate to the physical computing device, wherein the key pair is utilized as a token for supply-chain auditing associated with services performed by physical equipment associated with the physical computing device without the physical computing device transmitting the private key, wherein the physical computing device is located at the physical equipment, wherein the token is a digital wallet configured to store cryptocurrencies that are tied to the key pair, wherein the digital wallet is configured to be utilized to pay for the services performed by the physical equipment.

* * * * *